United States Patent [19]
Becker et al.

[11] 3,747,491
[45] July 24, 1973

[54] PHOTOGRAPHIC APPARATUS FOR USE WITH FLASHCUBES OR THE LIKE

[75] Inventors: Erwin Becker; Johann Putscher, Munich, both of Germany

[73] Assignee: AGFA-Gevaert Aktiengesellschaft, Leverkusen, Germany

[22] Filed: Mar. 29, 1972

[21] Appl. No.: 239,060

[30] Foreign Application Priority Data
Mar. 31, 1971 Germany.................. P 21 15 736.8

[52] U.S. Cl................. 95/11 L, 95/11.5 R, 240/1.3
[51] Int. Cl. ........................................... G03b 15/04
[58] Field of Search ............. 95/11 L, 11 R, 11.5 R; 240/1.3; 431/92, 93

[56] References Cited
UNITED STATES PATENTS
3,589,256  6/1971  Beach .............................. 95/11.5 R
3,584,794  6/1971  Beach .................................. 240/1.3

*Primary Examiner*—Robert P. Greiner
*Attorney*—Michael S. Striker

[57] ABSTRACT

A still camera for use with flashcubes of the type wherein the flash lamps can be fired in response to transmission of impacts to discrete piezoelectric crystals or the like and wherein the crystals can be struck by stressed wires which normally engage discrete abutments to be held in stressed positions. The camera housing supports a lever which can be pivoted by a slide in response to transport of the film by the length of a frame whereby the lever not only disengages the impeller wire for that flash lamp which faces the subject but also intercepts the thus disengaged wire to hold it in stressed position. The lever is disengaged from the impeller wire in response to depression of the release element so that the flash lamp which faces the subject is fired simultaneously with opening of the shutter. The lever and the slide are biased by discrete springs, and the slide serves as a means for opening the shutter simultaneously with permitting the lever to assume its normal or retracted position in which the lever does not interfere with indexing of the flashcube.

18 Claims, 2 Drawing Figures

PATENTED JUL 24 1973 3,747,491

PHOTOGRAPHIC APPARATUS FOR USE WITH FLASHCUBES OR THE LIKE

BACKGROUND OF THE INVENTION

The present invention relates to improvements in photographic apparatus for use with flashcubes and analogous sources of artificial light. More particularly, the invention relates to improvements in photographic apparatus for use with artificial light sources of the type having at least one flash lamp which can be fired in response to transmission of an impact against a piezoelectric crystal or an analogous firing device. As a rule, such light sources resemble indexible cubes having four equidistant flash lamps and four discrete firing devices, one for each flash lamp. Each firing device can receive an impact from a discrete impeller, such as a piece of stressed wire, which is normally maintained in engagement with a suitable abutment and must be disengaged from the respective abutment in order that the corresponding lamp can furnish artificial light at the time when the camera shutter opens to admit scene light against an unexposed film frame.

In presently known photographic apparatus which employ such types of light sources, the housing accommodates a member which is arranged to strike against the impeller wire of an unfired flash lamp (namely, that lamp which faces the subject), whereby the impeller wire is disengaged from its abutment and can strike against the respective firing device. A drawback of such apparatus is that the actuation of the member which disengages an impeller wire from the abutment necessitates the application of a substantial force; such force must be generated at the time when the release element of the photographic apparatus is moved to its operative position to effect an opening of the shutter. The application of a substantial force to the release element is likely to result in camera shake.

SUMMARY OF THE INVENTION

An object of the invention is to provide a novel and improved photographic apparatus, such as a still camera, which is provided with novel and improved means for firing flash lamps in artificial light sources of the type wherein the firing of a flash lamp necessitates the release of a stressed impeller so that the latter can strike against a piezoelectric crystal or the like.

Another object of the invention is to provide a photographic apparatus wherein the means for effecting the firing of a flash lamp simultaneously with the opening of the shutter can be actuated with the exertion of a minimal force so that the stresses which must be applied to the release element for the making of an exposure need not exceed those stresses which are necessary for the actuation of a camera without any means for the firing of flash lamps.

A further object of the invention is to provide a photographic apparatus with novel means which serves to effect the firing of flash lamps and can be prepared for operation in response to normal manipulation of the apparatus preparatory to the making of an exposure.

An additional object of the invention is to provide a photographic apparatus which can initiate the firing of a flash lamp simultaneously with the actuation of release means and in such a way that the firing does not necessitate the transmission of a blow to the impeller for that flash lamp which faces the subject.

Still another object of the invention is to provide a photographic apparatus with novel means which initiates the firing of flash lamps and which can also serve to insure that the source of artificial light assumes an optimum position with reference to the subject during the making of exposures with artificial light.

A further object of the invention is to provide a photographic apparatus wherein the indexing of a socket for a flashcube or an analogous source of artificial light can be carried out with the exertion of a force much smaller than that which is necessary to index the socket in a conventional photographic apparatus.

Another object of the invention is to provide a still camera which has a socket for retention and indexing of flashcubes and wherein the means for effecting the firing of flash lamps simultaneously with the opening of the shutter occupies less room than in conventional cameras.

The invention resides in the provision of a photographic apparatus, such as a still camera, which comprises a housing or body and a source of artificial light (preferably a flashcube) which is preferably removably and indexibly coupled with a socket of the housing and includes at least one flash lamp, impact-responsive firing means for the lamp, impeller means which is movable from a first stressed position through a second stressed position and to a third position to thereby impact or strike against the firing means with attendant firing of the flash lamp, and abutment means for normally releasably holding the impeller means in the first stressed position.

The apparatus further comprises disengaging means which is preferably provided in the housing and is movable from a first to a second position to thereby disengage the impeller means from the abutment means, retaining means provided on or associated with the disengaging means for maintaining the impeller means in the second stressed position in the second position of the disengaging means, and camera release means which is movable from an idle to an operative position to thereby effect a movement of the disengaging means from its second position with attendant separation of the retaining means from the impeller means so that the impeller means is freed for abrupt movement to its third position in order to effect a firing of the flash lamp at the time when the release means effects an opening of the shutter.

The apparatus further comprises motion transmitting means which can move the disengaging means from the first to the second position in response to at least one of the operations which include the transport of photographic film in the housing, the cocking of shutter opening means, and actuation of the release means. The motion transmitting means may be reciprocably and/or pivotably mounted in the housing to move in a first direction with attendant movement of the disengaging means to its second position and in a second direction with attendant movement of the disengaging means to its first position, preferably under the action of suitable biasing means which urges the disengaging means to its first position.

The novel features which are considered as characteristic of the invention are set forth in particular in the appended claims. The improved photographic apparatus itself, however, both as to its construction and its mode of operation, together with additional features and advantages thereof, will be best understood upon

BACKGROUND OF THE INVENTION

Figure 1:
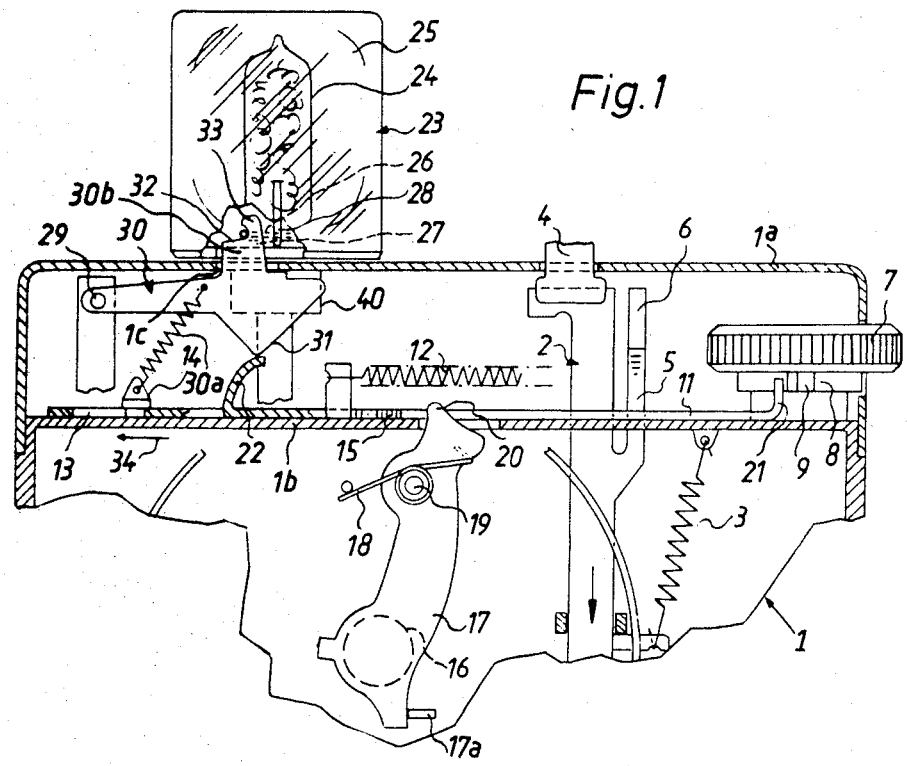
FIG. 1 is a side elevational view of a flashcube and a fragmentary vertical sectional view of a photographic apparatus which embodies one form of the invention.

FIG. 1 shows a portion of a still camera which comprises a housing 1. The top wall 1a of the housing 1 is provided with a slot for the depressible knob 4 of a camera release element 2 which is biased upwardly as viewed in FIG. 1, by a helical spring 3 so that it normally dwells in the illustrated idle position. The upper portion of the release element 2 is provided with a prong or arm 5 having a cam face 6 which can shift laterally (forwardly, as viewed in FIG. 1) a reciprocable motion-transmitting control member or slide 11. The housing 1 further accommodates a film transporting mechanism including a rapid transport wheel 7 which is provided with a disk-shaped cam 8 and two projections or teeth 9 (one shown) located diametrically opposite each other. Each of the teeth 9 can shift the slide 11 against the opposition of a helical spring 12 which urges the slide in a direction to the right, as viewed in FIG. 1. An elongated slot 13 in the left-hand end portion of the slide 11 receives a pin 14 which is mounted in a second wall or partition 1b of the housing 1 and defines a pivot axis for the slide 11. Thus, the latter is movable lengthwise in and counter to the direction indicated by an arrow 34, and is also pivotable about the axis of the pin 14. Reference may be had to U.S. Pats. Nos. 3,489,070, 3,512,466 and 3,526,178 which illustrate the manner in which the slide can reciprocate and pivot with reference to the housing of the camera.

An intermediate portion of the slide 11 is provided with a forwardly extending projection 15 which can pivot a simple shutter having a single blade 17. A torsion spring 18 is coiled around a shaft 19 for the blade 17 and biases the latter in a counterclockwise direction, as viewed in FIG. 1, so that the lower portion of the blade 17 normally overlies a light-admitting aperture 16 and abuts against a stop 17a. A lobe 20 at the upper end of the blade 17 extends into the path of movement of the projection 15 when the slide 11 is disengaged from the nearest tooth 9 of the wheel 7 and is propelled by spring 12 in a direction to the right, as viewed in FIG. 1.

The blade 17 then exposes the aperture 16 to scene light so that such light reaches the foremost unexposed film frame. The right-hand end portion of the slide 11 is bent upwardly, as at 21, so that it can be entrained by the oncoming tooth 9 when the wheel 7 is rotated in a clockwise direction, as viewed in FIG. 1, to thereby stress the spring 12 and to move the slide 11 in the direction indicated by the arrow 34. The spring 12 is mounted in such a way that it allows the projection 15 of the slide 11 to bypass the lobe 20 of the shutter blade 17 when the slide 11 is being cocked so that the blade 17 continues to overlie the aperture 16 during stressing of the spring 12. This is shown and described in the aforementioned patents. FIG. 1 shows the slide 11 in the fully cocked position in which the projection 15 is located to the left of the lobe 20, the spring 12 stores maximum energy, and the pivot pin 14 is located in the right-hand end portion of the slot 13.

The top wall 1a of the housing 1 is provided with a rotary indexible socket 40 for a source 23 of artificial light here shown as a flashcube having four equidistant flash lamps 24 each located in front of a reflector 25. Each of the flash lamps 24 can be fired in response to impact of a discrete stressed impeller wire 26 against a firing device 28. Prior to firing of a lamp 24, the respective impeller wire 26 bears, in a first stressed position, against an abutment 27 in the casing of the flashcube 23. The underside of the flashcube 23 has openings to afford access to the impeller wires 26. In order to fire a lamp 24, the corresponding impeller wire 26 must be disengaged from the associated abutment 27 so that it can strike against the respective firing device 28 (e.g., a piezoelectric crystal).

In accordance with a feature of the invention, the camera housing 1 further accommodates a disengaging lever 30 which is turnable on a pivot pin 29 and is mounted between the walls 1a and 1b in the region of the socket 40. The righthand portion of the lever 30 (as viewed in FIG. 1) has a suitably inclined cam face 31 which extends into the path of movement of a curved projection or lifter 22 of the slide 11. A helical spring 30a biases the lever 30 in a clockwise direction, as viewed in FIG. 1, so that the cam face 31 extends well into the path of movement of the lifter 22 when the spring 12 is free to contract and to maintain the slide 11 in its uncocked right-hand end position. The lever 30 is further provided with an upwardly projecting portion 30b which has an inclined disengaging surface 32 and a hooked retaining or intercepting element 33. The portion 30b of the lever 30 can be expelled outwardly or upwardly through a slot or window 1c of the top wall 1a so as to penetrate through the adjacent opening in the base of the flashcube 23 whereby the inclined disengaging surface 32 lifts the adjacent impeller wire 26 off the associated abutment 27; however, the thus disengaged impeller wire 26 is immediately intercepted by the retaining element 33 so that it dwells in a second stressed position and cannot strike against the corresponding firing device 28 as long as the lever 30 remains in the second position shown in FIG. 1. The lever 30 is maintained in such second position by the projection 22 of the slide 11 when the latter is held in its cocked position (shown in FIG. 1). The spring 30a permanently biases the lever 30 to a first or concealed position in which the portion 30b is retracted into the housing 1 and cannot interfere with indexing of the socket 40 and flashcube 23.

The operation:

When the user has completed the making of an exposure, the slide 11 dwells in its uncocked (right-hand end) position and its portion 21 is biased by spring 12 against the adjacent portion of the cam 8 on the rapid transport wheel 7 of the film transporting mechanism. In order to prepare the camera for the next exposure, the user must rotate the wheel 7 in a clockwise direction so that the oncoming tooth 9 of the wheel 7 engages the portion 21 and pushes the slide 11 toward the end position shown in FIG. 1 whereby the slide stresses the spring 12. The release element 2 is assumed to dwell in the illustrated idle position. While the slide 11 moves in the direction indicated by the arrow 34, its projection 15 bypasses the lobe 20 of the shutter blade 17 so that the latter continues to overlie the light admitting aperture 16 and abuts against the stationary stop 17a. Furthermore, while the slide 11 moves in the direction indicated by the arrow 34, its arcuate projection 22 engages the cam face 31 of the disengaging lever 30 and pivots this lever against the opposition of the spring 30a so that the lever pivots in a counterclockwise direction and causes its portion 30b to move upwardly through the slot 1c of the top wall 1a and into the adjacent opening in the base of the flashcube 23. The inclined face 32 of the lever portion 30b disengages the adjacent impeller wire 26 from the associated abutment 27 and the thus released impeller wire 26 is immediately intercepted by the hooked retaining element 33 of the lever 30 so that it cannot strike against the adjacent firing device 28. The lever 30 then remains in the illustrated second position as long as the slide 11 remains in the cocked position. It is assumed that the flashcube 23 was indexed prior to cocking of the slide 11 so that an unfired flash lamp 24 faces the subject; the impeller wire 26 for such flash lamp is then located in the range of the lever portion 30b.

In order to make an exposure with flash, the user of the camera depresses the knob 4 so as to move the release element 2 against the opposition of the spring 3. The cam face 6 on the prong 5 of the release element 2 then pivots the cocked slide 11 about the fixed pin 14 so that the portion 21 is disengaged from the adjacent tooth 9 of the rapid transport wheel 7 whereby the spring 12 is free to contract and immediately propels the slide 11 to its uncocked (right-hand end) position. The direction of movement of the slide 11 under the bias of the spring 12 is counter to that which is indicated by the arrow 34. During such movement of the slide 11, the projection 22 moves in a direction away from the pivot pin 29 so that the spring 30a is free to contract and pivots the lever 30 in a clockwise direction. The retaining element 33 is disengaged from the adjacent impeller wire 26 so that the latter is free to move to a third position in which it strikes against the firing device 28 and thereby fires the corresponding flash lamp 24. Such firing of the flash lamp 24 takes place while the shutter blade 17 allows scene light to pass through the aperture 16 and to impinge upon the foremost unexposed film frame. The shutter blade 17 is pivoted by the projection 15 whose position with reference to the projection 22 can be readily selected in such a way that the firing of the flash lamp 24 which faces the subject is synchronized with opening of the shutter.

An important advantage of the improved camera is that its housing 1 need not be provided with an impeller for the firing devices of the flashcube. Instead, the camera comprises means (lever 30 and slide 11) which is capable of automatically preparing a flash lamp 24 for firing during such manipulation of the camera which must be carried out prior to the making of an exposure. In the illustrated embodiment, the manipulation involves a transport of photographic roll film by the length of a frame. The slide 11 preferably serves as a means for automatically arresting the rapid transport wheel 7 when the latter completes the transport of roll film by the length of a frame; the pin 14 is then received in the rightmost portion of the slot 13 and prevents further cocking of the slide 11 so that the user is informed that the transport of photographic film by the length of a frame is completed and that the camera is ready to make the next exposure.

Another advantage of the improved camera is that, due to the absence of an impeller in the camera housing, the making of an exposure requires the exertion of a very small force, i.e., only such force which is needed to disengage the portion 21 of the slide 11 from the adjacent tooth 9 so that the spring 12 can contract in order to cause the slide 11 to open the shutter and to initiate the firing of that flash lamp 24 which faces the subject. Such mode of operation reduces the likelihood of camera shake and enables the user to make exposures with longer exposure times without resorting to a tripod or the like.

Still further, the improved camera enables the user to index the flashcube 23 with the exertion of a minimal force. This will be readily understood since, as soon as the user depresses the knob 4 of the release element 2, the slide 11 moves its projection 22 away from the cam face 31 on the disengaging lever 30 so that the latter's portion 30b can be retracted into the housing 1 by the spring 30a. This means that, when the flashcube is thereupon indexed to place a fresh lamp 24 into firing position, the indexing operation need not be carried out against the opposition of a part which sticks out from the top wall 1a of the housing 1. In fact, the improved camera need not even be provided with detent means for yieldably maintaining the flashcube 23 in one of four predetermined positions because the flashcube can be accurately indexed by the portion 30b of the displacing lever 30 and by one of the impeller wires 26 when such impeller wire is caused to bear against the retaining or intercepting element 33.

Figure 2:
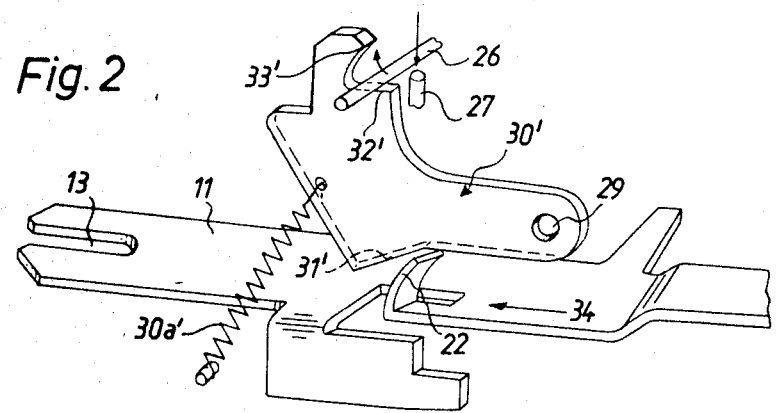
FIG. 2 is a perspective view of certain component parts in a modified photographic apparatus.

FIG. 2 illustrates a portion of a second still camera wherein the disengaging lever 30' is mounted in such a way that it is biased (by a helical spring 30a') in a counterclockwise direction and that it pivots clockwise when its cam face 31' is engaged by the projection 22 of the motion transmitting slide 11. Also, and contrary to the construction shown in FIG. 1, the retaining or intercepting element 33' of the lever 30' is located to the right of the disengaging surface 32' because the impeller wire 26 of the flashcube normally abuts against the right-hand side of the abutment 27 and tends to move clockwise when lifted off the member 27. Otherwise, the construction of the camera which embodies the parts 11 and 30' shown in FIG. 2 is identical with or clearly analogous to that of the camera shown in FIG. 1.

The improved photographic apparatus is susceptible of many additional modifications. For example, the displacing lever 30 or 30' can be articulately connected with or permanently biased against the motion transmitting slide 11, or it can constitute an at least partially elastic integral part of the motion transmitting slide. Furthermore, the slide 11 can be replaced with a motion transmitting member which is turnable about an axis so as to move in a first direction in order to move the lever 30 or 30' from the first position to the second position (see the position of the lever 30 in FIG. 1) and in a second direction in order to allow the spring 30a or 30a' to return the lever 30 or 30' to its first position with attendant firing of that flash lamp 24 which faces the subject. Still further, the lever 30 or 30' can be replaced by a slide or a like disengaging device which is reciprocable between its first and second positions. Also, the lever 30 or 30' (or an analogous disengaging device) can be moved to its second position in response to cocking of the shutter, in response to movement of the release element 2 prior to opening of the shutter or subsequent to such opening (i.e., in response to movement of the release element from its operative position back to the idle position shown in FIG. 1). Finally, the motion transmitting slide 11 could be replaced by a camshaft which should preferably perform several functions, for example, the cocking of a shutter in response to rotation in one direction whereby a cam on the shaft would cause the lever 30 or 30' to move to the second position, and the initiation of the movement of lever 30 or 30' to its furst position (in response to the bias of the spring 30a or 30a') in response to rotation of the shaft in the opposite direction. Such modifications will be readily understood and visualized upon perusal of the description of FIGS. 1 and 2. All that counts is to provide the photographic apparatus with disengaging means for the impeller wires of a flashcube or a like source of artificial light and to further provide the apparatus with motion transmitting means which can cause the disengaging means to disengage a stressed impeller from the respective abutment prior to the making of an exposure with flash so that the impeller wire can be thereupon freed for movement against the associated firing device without the exertion of a substantial force at the time when the user decides to actuate the release element. As mentioned before, the movement of lever 30 or 30' or analogous disengaging means from its first to its second position can take place in response to carrying out of one or more operations which must be performed in the normal course of manipulation of the photographic apparatus, such as the transport of film, the cocking of the shutter, and/or the movement of the release element between its idle and operative positions. It is also possible to provide between the shutter and the disengaging means an operative connection which insures that the disengaging means is caused or allowed to reassume its first position (with attendant firing of a flash lamp) in response to opening of the shutter.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a photographic apparatus, a combination comprising a housing; a source of artificial light supported by said housing and including at least one flash lamp, impact-responsive firing means for said flash lamp, impeller means movable from a first stressed position through a second stressed position to a third position to thereby impact against said firing means with attendant firing of said lamp, and abutment means for normally holding said impeller means in said first stressed position; disengaging means provided in said housing and movable from a first to a second position to thereby disengage said impeller means from said abutment means; retaining means associated with said disengaging means for maintaining said impeller means in said second stressed position in said second position of said disengaging means; and release means movable from an idle to an operative position to thereby effect a movement of said disengaging means from said second position with attendant separation of said retaining means from said impeller means so that the latter is freed for movement to said third position.

2. A combination as defined in claim 1, wherein said housing is provided with an indexible socket and said source of artificial light is separably connected with said socket to be indexible therewith between plural positions, said source comprising a plurality of flash lamps and an equal number of firing, impeller and abutment means, a different impeller means being located in the range movement of said disengaging means in each of said plural positions of said source.

3. A combination as defined in claim 2, wherein said source is a flashcube.

4. A combination as defined in claim 1, further comprising film transporting means actuatable to transport the film in said housing and motion transmitting means for moving said disengaging means from said first to said second position in response to actuation of said film transporting means.

5. A combination as defined in claim 1, further comprising motion transmitting means for moving said disengaging means to said second position in response to movement of said release means.

6. A combination as defined in claim 1, further comprising a shutter, means for cocking said shutter, and motion transmitting means for moving said disengaging means from said first to said second position in response to cocking of said shutter.

7. A combination as defined in claim 1, further comprising film transporting means actuatable to transport the film in said housing and motion transmitting means mounted in said housing for movement in a first direction in response to actuation of said film transporting means to thereby move said disengaging means from said first to said second position and in a second direction in response to movement of said release means to said operative position to thereby effect the movement of said disengaging means from said second position.

8. A combination as defined in claim 7, wherein said motion transmitting means is reciprocable in said first and second directions.

9. A combination as defined in claim 1, further comprising means for biasing said disengaging means to said first position thereof.

10. A combination as defined in claim 9, further comprising film transporting means actuatable to transport the film in said housing and motion transmitting means mounted in said housing for movement in a first direction in response to actuation of said film transporting means to thereby move said disengaging means to said second position against the opposition of said biasing means and in a second direction in response to movement of said release means to said operative position to thereby free said disengaging means for movement to said first position under the action of said biasing means.

11. A combination as defined in claim 10, wherein said motion transmitting means comprises a projection and said disengaging means comprises a cam face which is engaged and displaced by said projection in response to movement of said motion transmitting means in said first direction.

12. A combination as defined in claim 10, further comprising means for preventing further movement of said motion transmitting means in said first direction upon completed transport of the film in said housing by the length of a frame.

13. A combination as defined in claim 9, further comprising shutter means movable between open and closed positions and shutter opening means movable to a cocked position to thereby move said disengaging means to said second position against the opposition of said biasing means, said shutter opening means being movable from said cocked position in response to movement of said release means from said idle position to thereby open said shutter means and to simultaneously effect a movement of said disengaging means to said first position under the action of said biasing means.

14. A combination as defined in claim 1, wherein said disengaging means comprises a surface which is arranged to disengage said impeller means from said abutment means in response to movement of said disengaging means from said first position, said retaining means comprising a hook-shaped element which is adjacent to said surface.

15. A combination as defined in claim 1, further comprising motion transmitting means for moving said disengaging means to said second position in response to at least one of the operations including the transport of film in said housing and the cocking of shutter opening means in said housing.

16. A combination as defined in claim 15, further comprising coupling means articulately connecting said motion transmitting means with said disengaging means.

17. A combination as defined in claim 15, wherein said motion transmitting means and said disengaging means are movable relative to each other.

18. A combination as defined in claim 1, wherein said source of artificial light is movable relative to said housing and assumes a predetermined position with reference to said housing in response to engagement of said retaining means with said impeller means.

* * * * *